(12) United States Patent
Larsson

(10) Patent No.: US 7,662,276 B2
(45) Date of Patent: Feb. 16, 2010

(54) WATER PURIFIER

(75) Inventor: Anders Larsson, Västerås (SE)

(73) Assignee: Glow AB, Vasteras (SE)

( * ) Notice: Subject to any disclaimer, the term of this patent is extended or adjusted under 35 U.S.C. 154(b) by 424 days.

(21) Appl. No.: 11/791,829

(22) PCT Filed: Dec. 6, 2005

(86) PCT No.: PCT/SE2005/001837

§ 371 (c)(1),
(2), (4) Date: Jun. 8, 2007

(87) PCT Pub. No.: WO2006/062467

PCT Pub. Date: Jun. 15, 2006

(65) Prior Publication Data

US 2007/0256962 A1 Nov. 8, 2007

(30) Foreign Application Priority Data

Dec. 7, 2004 (SE) .................................... 0402968

(51) Int. Cl.
*C02F 1/32* (2006.01)
(52) U.S. Cl. .................... 210/85; 210/232; 210/295; 210/315
(58) Field of Classification Search .................... 210/85, 210/232, 295, 315
See application file for complete search history.

(56) References Cited

U.S. PATENT DOCUMENTS

| 5,266,215 A | 11/1993 | Engelhard |
| 5,529,689 A * | 6/1996 | Korin ......................... 210/232 |
| 5,540,848 A * | 7/1996 | Engelhard ................... 210/748 |
| 6,120,691 A * | 9/2000 | Mancil ....................... 210/748 |

FOREIGN PATENT DOCUMENTS

| WO | 0006499 A1 | 2/2000 |
| WO | 0078681 A2 | 12/2000 |

\* cited by examiner

*Primary Examiner*—Terry K Cecil
(74) *Attorney, Agent, or Firm*—Young & Thompson

(57) ABSTRACT

A water purifier for the purification of pressurized water includes a filter chamber (16) with a cylindrical adsorption filter (17), a UV chamber (19) that is provided inside the adsorption filter (17), an incoming water intake (15) to the filter chamber (16), a spout (20) emanating from the filter chamber (16) for the discharge of water from the filter chamber (16), a space (11) laterally displaced relative to the filter chamber (16), components for the control of the function of the water purifier being received in the space (11), an upper demountable part (3) and a lower demountable part (5). The connection of the incoming water is made to a central main portion (1) of the water purifier, that the discharge of the purified water is effected from the central main portion (1), and that the central main portion (1) is located between the demountable parts (3, 5).

20 Claims, 6 Drawing Sheets

WATER PURIFIER

TECHNICAL FIELD OF THE INVENTION

The present invention relates to a water purifier for the purification of pressurized water, said water purifier comprising a filter chamber with a filter, a UV chamber that is provided inside the filter, an incoming water intake to the filter chamber, a spout emanating from the UV chamber for the discharge of water from the UV chamber, a space separated from the filter chamber, components for the control of the function of the water purifier being received in said space, an upper demountable part and a lower demountable part.

PRIOR ART

From GB 2 175 779 A a water purifier is previously known that comprises a UV lamp for purifying the water that passes through the water purifier. In an external space, outside the water purifier itself, certain peripheral equipment is provided to control the functions of the water purifier. The water purifier has also two end caps that are provided with passages, e.g. for electric cables.

From U.S. Pat. No. 5,266,215 a water purifier is previously known, said purifier comprising a carbon filter cartridge and a UV lamp, the carbon filter cartridge surrounding the UV lamp. When exchanging the carbon filter cartridge a threaded upper cover is removed and when the UV lamp is exchanged a bottom part is demounted, said bottom part being fastened to the rest of the water purifier by a number of radial screws. The carbon filter cartridge has an axial extension along approximately half the effective height of the water purifier. The supplied water, i.e. the water to be purified, is entered via the bottom part and the output water, i.e. the purified water, is discharged from the water purifier via the upper cover.

OBJECTS AND FEATURES OF THE INVENTION

A primary object of the invention is to present a water purifier of the type defined above, the water purifier being extremely user friendly as regards maintenance and exchange of consumption parts of the water purifier, e.g. filters, UV lamp and quartz glass tube.

A further object of the present invention is that the water purifier should be extremely simple and inexpensive to manufacture.

Still an object of the present invention is that the components that control the function of the water purifier should be assembled and protected in an easily accessible space that also is separated from the space that receives the consumption parts.

At least the primary object of the present invention is realized by means of a water purifier that has been given the features of the appending independent claim 1. Preferred embodiments of the invention are defined in the dependent claims.

BRIEF DESCRIPTION OF THE DRAWINGS

Below preferred embodiments of the invention will be described, reference being made to the accompanying drawings, where.

DETAILED DESCRIPTION OF PREFERRED EMBODIMENTS OF THE INVENTION

Figure 1:
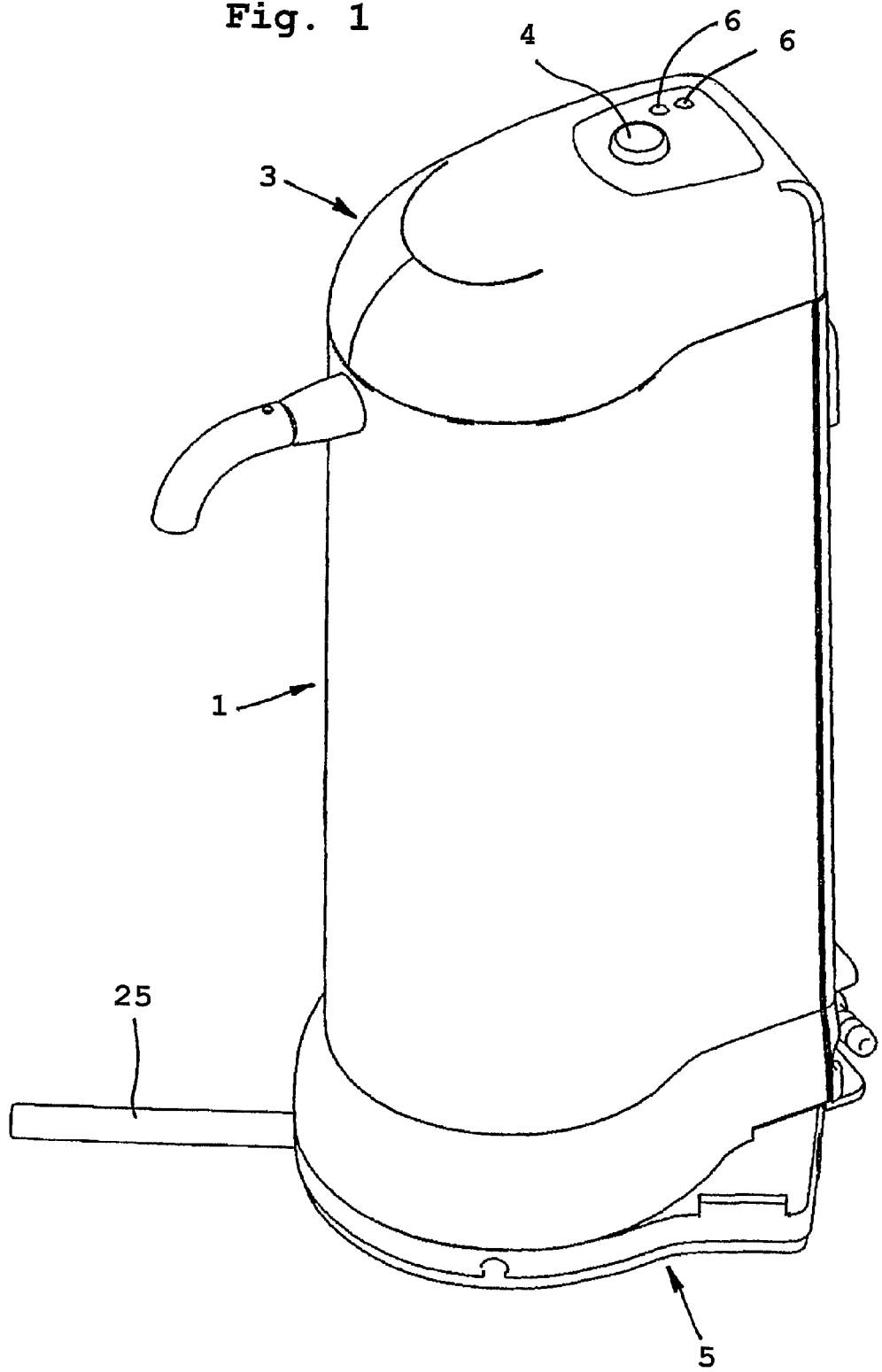
FIG. 1 shows a perspective view of a water purifier according to the present invention, a bottom part of the water purifier being somewhat turned relative to the rest of the water purifier.

The water purifier shown in FIG. 1 comprises a main portion 1 with elongated shape, a cover 3 and a bottom part 5. In the shown embodiment the cover 3 is detachably connected to the main portion 1 by means of a snap-on connection while the bottom part 5 is connected to the main portion 1 by means of a thread coupling. To that purpose the bottom part 5 has an external thread 7 while the main portion 1 has an internal thread 9, see FIG. 3. Thus, the main portion is a central portion that is located between the cover 3 and the bottom part 5. As is most evident from FIG. 2 a control button 4 and indication lamps are provided on top of the main portion 1. By means of the control button 4 the function of the water purifier is activated and by means of the indication lamps 6 the user is given information, e.g. about exchange of filter or degree of purification as regards the water discharged from the water purifier.

Figure 3:
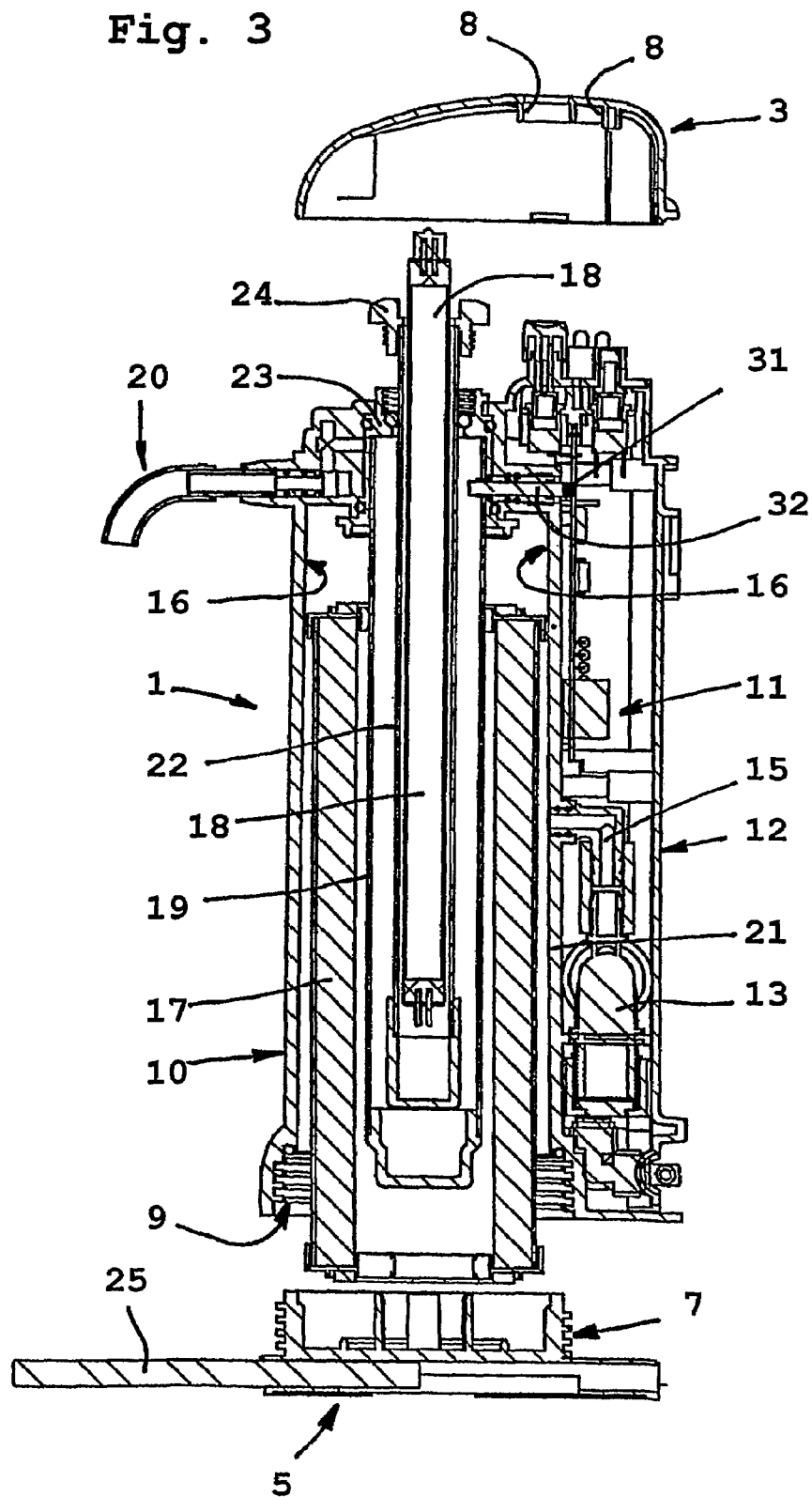
FIG. 3 shows a longitudinal section through the water purifier in the position according to FIG. 2, the back being mounted and the section being located in the longitudinal centre of the water purifier.

As is most evident from FIG. 3 the cover 3 is equipped with holes 8 intended for the control button and the indication lamps 6.

Figure 2:
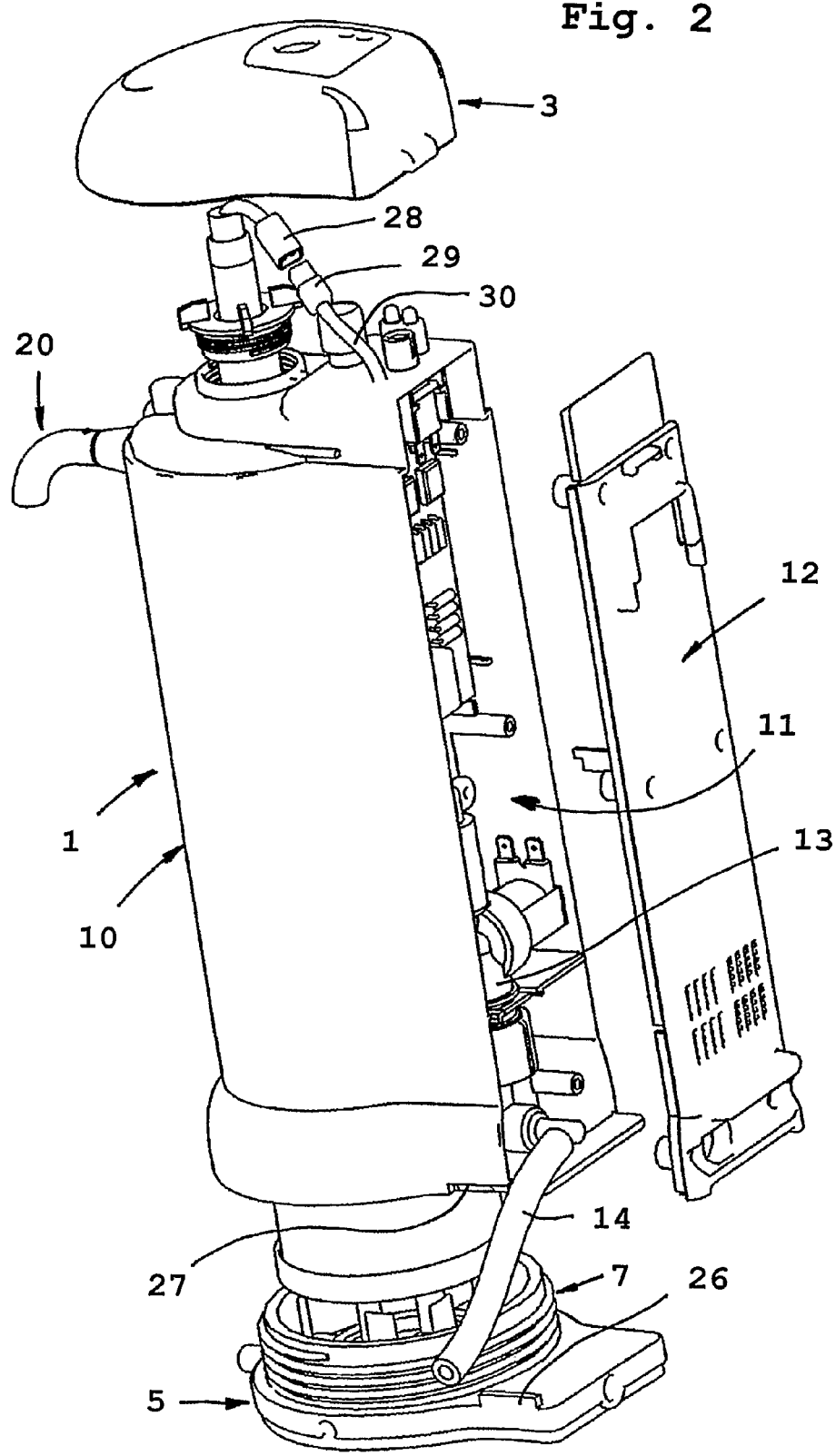
FIG. 2 shows a perspective exploded view of the water purifier according to FIG. 1, a cap, a bottom part and a back of the water purifier being demounted.

The main portion 1 of the water purifier according to the present invention comprises an external casing 10, see FIG. 2, that holds in principle all components essential to the function of the water purifier. The casing is preferably an injection moulded plastic article, i.e. it is manufactured in one piece.

As is most evident from FIG. 2 the main portion comprises a laterally displaced space 11 that is defined on one hand of parts of the casing 10 and on the other hand of a back 12 that is detachable relative to the casing 10. In the space 11 certain electronic components are provided as well as an inlet valve 13 for the incoming water, said water normally coming from a pressurized water supply, said supply could be a part of a municipal water supply system or constitute a pressure tank in a private water supply system. As is shown in FIG. 2 an inlet pipe 14 for the incoming water is connected to the inlet valve 13. As is most evident from FIG. 3 a connecting pipe 15 extends between the inlet valve 13 and a filter chamber 16 of the main portion 1. The filter chamber 16 is defined on one hand by parts of the casing 10 and on the other hand by the bottom part 5. The casing 10 has a partition 21 that constitutes a part of the filter chamber 16. The partition 21 also constitutes a part of the laterally displaced space 11.

In the shown embodiment a filter 17 is provided in the filter chamber 16, said filter 17 being both a mechanical filter and an adsorption filter (carbon filter), a UV-chamber 19 that is provided inside the filter 17, a quartz glass tube 22 provided inside the UV-chamber 19 and a UV-lamp 18 provided inside the quartz glass tube 22.

As is most evident from FIG. 2 a first part 28 of a plug-in unit is provided at the upper end of the UV-lamp 18 while a second part 29 of the plug-in unit is connected to the laterally displaced space 11 via a cable 30.

In the shown embodiment the filter 17 generally is in the shape of a cylinder with a certain wall thickness. The internal space of the cylinder accommodates the UV chamber 19, the quartz glass tube 22 and the UV-lamp 18. As is most evident from FIG. 3 the quartz glass tube 22 is equipped with a threaded socket 24 that is received in a threaded holder 23 of the casing 10. When the quartz glass tube 22 is demounted the socket 24 is unscrewed from the holder 23, see FIG. 3.

Figure 4:
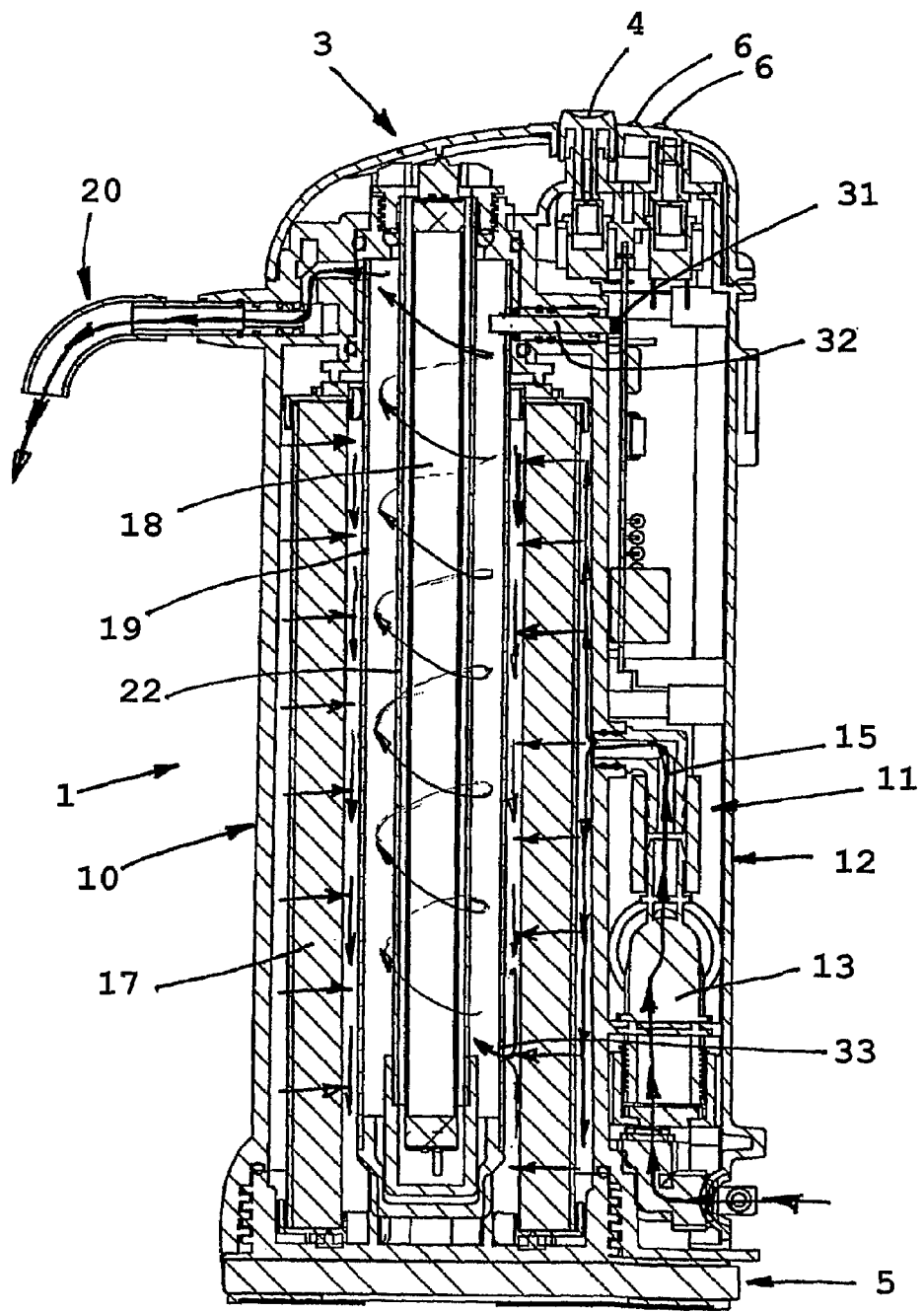
FIG. 4 shows a longitudinal section through the water purifier in assembled state, the section being located in the longitudinal centre of the water purifier.

In FIG. 4 it is schematically shown how the water entering the filter chamber 16 is passing through the filter 17, into the UV-chamber 19, by an opening 33 that is located at the lower part of the water purifier, and upwards along the quartz glass tube 22 that surrounds the UV-lamp 18. In this connection it should be mentioned that the water purifier according to the present invention is equipped with a UV-sensor 31 that registers the intensity from the UV-lamp 18, the UV-sensor 31 being located in the laterally displaced space 11. A light guide 32 is connected to the UV-sensor 31, said light guide 32 extending into the UV-chamber 19. The light guide 32 is received in a passage that extends between the UV-chamber 19 and the laterally displaced space 11. The light guide 32 may for instance be manufactured from quartz glass. The function of the UV-sensor 31 is to control, via the light guide 32, that the level of intensity in the UV-chamber 19 is sufficient to have an acceptable disinfection of the water.

The water that is purified in the water purifier is discharged from the UV-chamber 19 via a spout 20 that is provided in the upper region of the main portion 1. Due to the pressure that is present in the water conduit system the water to be purified flows through the filter 17, through the UV-chamber 19 and out through the spout 20.

In FIG. 3 the exchange of the filter 17 and the UV-lamp 18 is illustrated. As regards the exchange of the filter 17 the bottom part 5 is removed from the main portion 1. This is effected by unscrewing the bottom part 5 from the main portion 1. In this connection it should be pointed out that the bottom part 5 does not have any connections or passages for pipes or cables. This is an essential advantage in connection with the unscrewing of the bottom part 5 from the main portion 1. In order to facilitate the turning of the bottom part 5 relative to the main portion 1 the bottom part 5 is equipped with a telescopic rod 25 that is displaceable in its longitudinal direction relative to the bottom part 5. Thus, the rod 25 may be transferred to an inactive position where it is fully received inside the bottom part 5. When the bottom part 5 is separated from the main portion 1 the filter 17 may be removed through the opening thus created. A new filter 17 may now be mounted in the filter chamber 16 and the bottom part 5 is again screwed to the main portion 1. In order to guarantee that the bottom part 5 assumes a correct position relative to the main portion 1 the bottom part 5 is equipped with a stopper 26 that cooperates with an abutment surface 27 of the main portion 1.

When exchanging the UV-lamp 18 the cover 3 is removed from the main portion 1. This is a simple operation since the cover 3 is detachably connected to the main portion 1 via a snap-on connection. In this connection it should be pointed out that the cover is not equipped with any connections or passages for pipes or cables. This is an essential advantage in connection with the removal of the cover 3 from the main portion 1. Then the portions 28, 29 of the plug-in unit are separated and the UV-lamp 18 may be pulled out of the quartz glass tube 22.

If it comes to an exchange of the quartz glass tube 22 the socket 24 is unscrewed from the holder 23 and the quartz glass tube 22, with the UV-lamp 18, may be removed from the main portion 1. The quartz glass tube 22 may now be exchanged or cleaned.

If there is a need for maintenance or exchange of any of the components that are provided in the laterally displaced space 11 the back 12 is demounted and proper access to said components is achieved. In this connection it should be pointed out that the laterally displaced space 11, via the partition 21 of the casing 10, is completely separated from the filter chamber 16, i.e. there is no risk of water penetration into the laterally displaced space 11.

Figure 5:
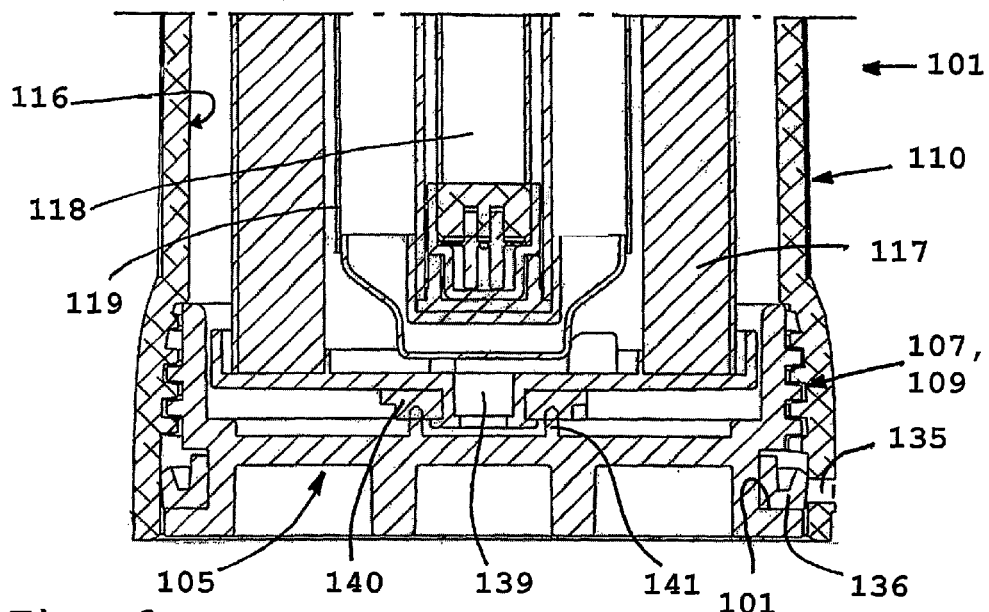
FIG. 5 shows a section through a lower portion of a water purifier according to the present invention where the bottom part and the lower portion of the main portion have an alternative design, the bottom part being in a an inner position.
Figure 6:
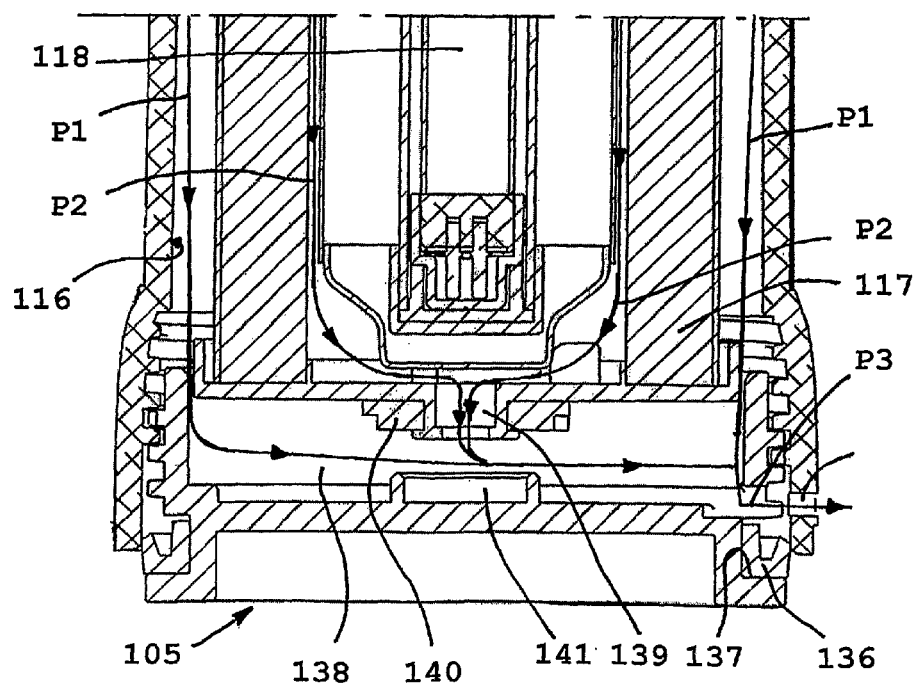
FIG. 6 shows the corresponding lower portion of the water purifier as in FIG. 5, the bottom part however being in an outer position.

In FIGS. 5 and 6 an alternative embodiment of the lower part of the main portion 101 and the bottom part 105 is shown. Thus, the main portion 101 is equipped with a first outlet opening 135 in the area of its lower end. The bottom part 105 has an annular first sealing 136 that extends around the bottom part 105 and rests upon a shoulder 137 of the bottom part 105. An external thread 107 of the bottom part 105 cooperates with an internal thread 109 in the area of the lower end of the main portion 101. According to this embodiment the bottom part 105 has no telescopic rod. The water purifier according to FIGS. 5 and 6 also comprises a filter chamber 116, a filter 117 and a UV-chamber 119.

In the position of the bottom part 105 shown in FIG. 5, i.e. when the bottom part 105 is fully screwed into the main portion 101, the first outlet opening 135 is blocked by the first sealing 136. In connection therewith a second opening 139 in the bottom of the filter chamber is sealed by a second sealing 140 that cooperates with an annular rim 141 of the bottom part 105.

In the position shown in FIG. 6, i.e. when the bottom part 105 is unscrewed to such a degree that the sealing 136 no longer blocks the opening 135 the water inside the water purifier may be discharged through the outlet opening 135. In connection therewith the water outside the filter flows in accordance with the arrows P1 while the water inside the UV-chamber 119 flows in accordance with the arrows P2. These two water flows are united in a common flow P3 in a bottom space 138 before the water is discharged through the outlet opening 135.

Figure 7:
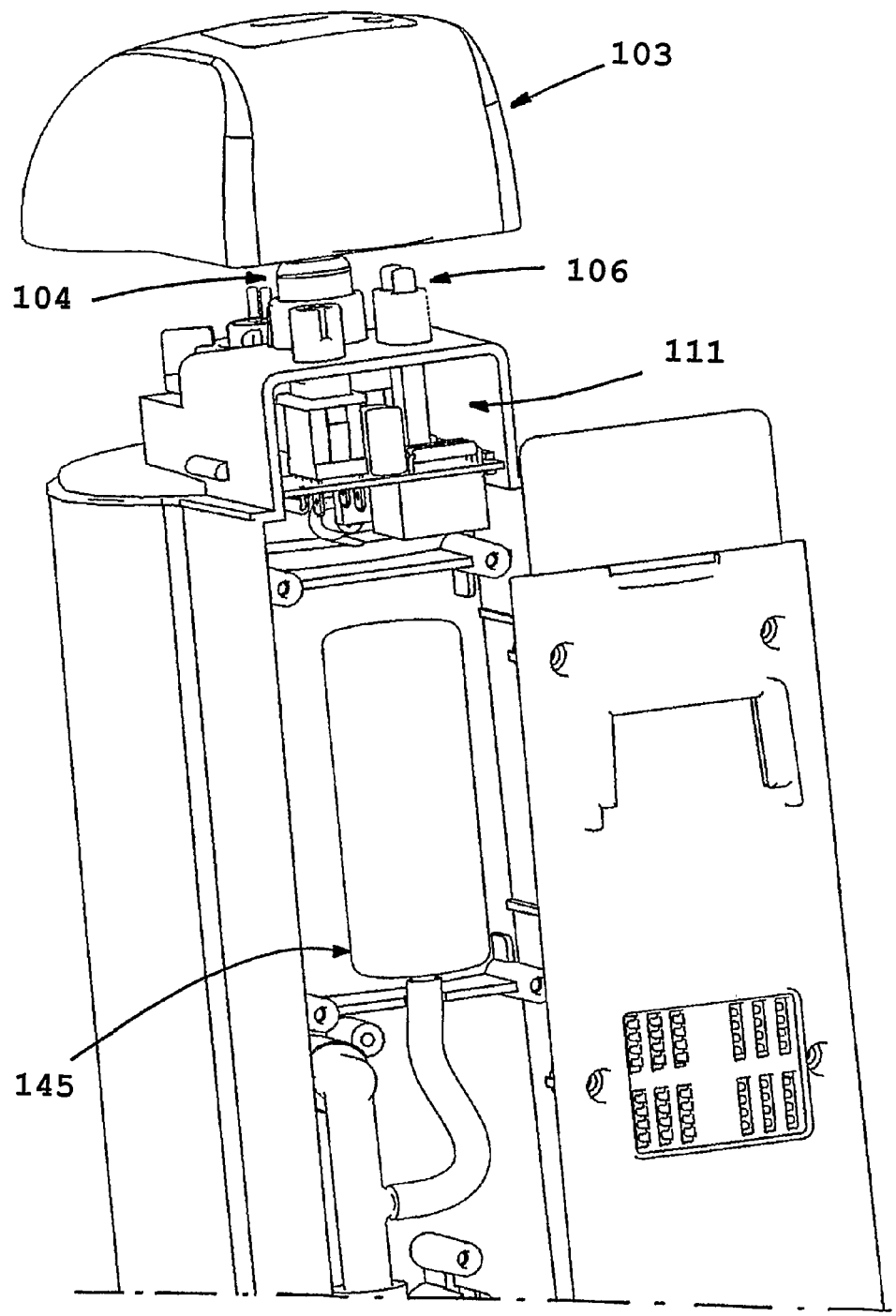
FIG. 7 shows a perspective view of an upper portion of an alternative embodiment of a water purifier according to the present invention.

FIG. 7 shows a perspective view of an upper part of a water purifier according to the present invention, a space 111 for electronic components being provided below the cover 103 in the area of the upper end of the water purifier. By this location of the space 111 the electronic components are closer to the control button 104 and the indication lamps 106. In the embodiment according to FIGS. 1-4 the corresponding space 11 extends along an upper part of the main portion 1. In the space that has been made available by the embodiment according to FIG. 7 a device 145 has been provided, said device preventing dripping from the spout 20 of the water purifier. This device is previously known and works according to the ejector principle.

Generally, it should be pointed out that the components included in the water purifier, e.g. the inlet valve, the UV-lamp, the UV-sensor and the electronic peripheral equipment, demand electric current supply, the voltage of this electric current may vary in accordance with the circumstances. Normally, the voltage constitutes 220V or 110V. It is also possible to work with a voltage of 12V, this voltage may be given by a car battery. In this connection it should be pointed out that the mentioned voltage figures only constitutes examples. There may be voltages that differ from the given ones, the water purifier according to present invention of course may be designed to handle also these voltages. In the present description of the water purifier no specific details are given about this current supply. The reason therefore is that the current supply is designed in a conventional way.

To sum up, the water purifier according to the present invention is designed in a way very much to the purpose. All connections of pipes and cables are made to the main portion 1. This means that the cover 3 and the bottom part 5 are completely separate parts without any attached pipes or cables.

FEASIBLE MODIFICATIONS OF THE INVENTION

In the embodiment described above the filter 17 constitutes a combined mechanical filter and an adsorption filter. Within the scoop of the present invention it is feasible that the filter surrounding the UV-chamber 19 only constitutes an adsorption filter. In such a case it might be suitable with some kind of complementary filter that is provided in front of the connection of the inlet pipe 14 to the water purifier.

The invention claimed is:

1. Water purifier for the purification of pressurized water, said water purifier comprising a filter chamber (16) with a filter (17; 117), a UV-chamber (19; 119) with a UV-lamp (18; 118), the UV-chamber (19; 119) being provided inside the filter (17; 117), an incoming water intake (15) to the filter chamber (16), a spout (20) for the discharge of water from the UV-chamber (19; 119), a space (11; 111) separated from the filter chamber (16), components for the control of the function of the water purifier being received in said space (11; 111), an upper demountable part (3) and a lower demountable part (5; 105), wherein the connection of the incoming water is made to a central main portion (1; 101) of the water purifier, that the discharge of the purified water is effected from the central main portion (1; 101), and that the central main portion (1; 101) is located between the demountable parts (3, 5; 105).

2. Water purifier according to claim 1, wherein the main portion (1; 101) comprises a casing (10; 110) that is manufactured in one piece, and that the casing (10; 110) defines essential parts of the filter chamber (16; 116).

3. Water purifier according to claim 2, wherein the filter (17; 117) is exchangeable when the lower demountable part (5; 105) has been demounted from the main portion (1; 101).

4. Water purifier according to claim 2, wherein the UV-lamp (18; 118) is exchangeable when the upper demountable part (3) has been demounted from the main portion (1; 101).

5. Water purifier according to claim 2, wherein it comprises a UV-sensor (31) that registers the intensity from the UV-lamp (18; 118), and that a light guide (32) extends into the UV-chamber (19; 119), said light guide being connected to the UV-sensor (31).

6. Water purifier according to claim 1, wherein the filter (17; 117) is exchangeable when the lower demountable part (5; 105) has been demounted from the main portion (1; 101).

7. Water purifier according to claim 6, wherein the UV-lamp (18; 118) is exchangeable when the upper demountable part (3) has been demounted from the main portion (1; 101).

8. Water purifier according to claim 6, wherein it comprises a UV-sensor (31) that registers the intensity from the UV-lamp (18; 118), and that a light guide (32) extends into the UV-chamber (19; 119), said light guide being connected to the UV-sensor (31).

9. Water purifier according to claim 6, wherein the lower demountable part (5; 105) is connected to the main portion (1; 101) by means of a thread coupling (7, 9; 107, 109).

10. Water purifier according to claim 9, wherein the UV-lamp (18; 118) is exchangeable when the upper demountable part (3) has been demounted from the main portion (1; 101).

11. Water purifier according to claim 9, wherein it comprises a UV-sensor (31) that registers the intensity from the UV-lamp (18; 118), and that a light guide (32) extends into the UV-chamber (19; 119), said light guide being connected to the UV-sensor (31).

12. Water purifier according to claim 9, wherein the lower demountable part (105) is equipped with an annular sealing (136), that an outlet opening (135) is provided in the area of the lower end of the casing (110), and that the sealing (136) in active position blocks the outlet opening (135).

13. Water purifier according to claim 12, wherein the UV-lamp (18; 118) is exchangeable when the upper demountable part (3) has been demounted from the main portion (1; 101).

14. Water purifier according to claim 12, wherein it comprises a UV-sensor (31) that registers the intensity from the UV-lamp (18; 118), and that a light guide (32) extends into the UV-chamber (19; 119), said light guide being connected to the UV-sensor (31).

15. Water purifier according to any claim 1, wherein the UV-lamp (18; 118) is exchangeable when the upper demountable part (3) has been demounted from the main portion (1; 101).

16. Water purifier according to claim 15, wherein it comprises a UV-sensor (31) that registers the intensity from the UV-lamp (18; 118), and that a light guide (32) extends into the UV-chamber (19; 119), said light guide being connected to the UV-sensor (31).

17. Water purifier according to claim 1, wherein it comprises a laterally displaced space (11) that is equipped with a demountable back (12).

18. Water purifier according to claim 17, wherein an inlet valve (13) is provided in the laterally displaced space (11), and that the inlet valve (13) has means to connect to a pipe (14) for incoming water.

19. Water purifier according to claim 18, wherein the water that passes the inlet valve (13) is supplied to the filter chamber (16) in a region between the two demountable parts (3, 5; 105).

20. Water purifier according to claim 1, wherein it comprises a UV-sensor (31) that registers the intensity from the UV-lamp (18; 118), and that a light guide (32) extends into the UV-chamber (19; 119), said light guide being connected to the UV-sensor (31).

* * * * *